W. W. CROOKER.

Assignor to J. F. SWAIN.

BLACKING AND BURNISHING BOOTS OR SHOES.

No. 11,144. Reissued Feb. 10, 1891.

WITNESSES.
A. D. Harrison
P. A. McShane

William W. Crooker
INVENTOR.
by Wright, Brown & Crossley.
Attys.

UNITED STATES PATENT OFFICE.

WILLIAM W. CROOKER, OF LYNN, MASSACHUSETTS, ASSIGNOR TO JOHN F. SWAIN, OF SAME PLACE.

BLACKING AND BURNISHING BOOTS OR SHOES.

SPECIFICATION forming part of Reissued Letters Patent No. 11,144, dated February 10, 1891.

Original No. 438,470, dated October 14, 1890. Application for reissue filed January 9, 1891. Serial No. 377,291.

*To all whom it may concern:*

Be it known that I, WILLIAM W. CROOKER, of Lynn, in the county of Essex and State of Massachusetts, have invented certain new and useful Improvements in Finishing Boot or Shoe Heel and Sole Edges, Shanks, and Bottoms, of which the following is a specification.

This invention relates to the operation of imparting a bright wax finish to the heel and sole edges, shanks, bottoms, and other parts of boots or shoes which before the finishing operation are of the natural color of the leather.

The invention has for its object to provide an improved method for rapidly and uniformly waxing and polishing the surfaces of the parts above specified and imparting a brilliant and desirable finish thereto.

To these ends the invention consists in the improvements which I will now proceed to describe and claim.

Figure 1:
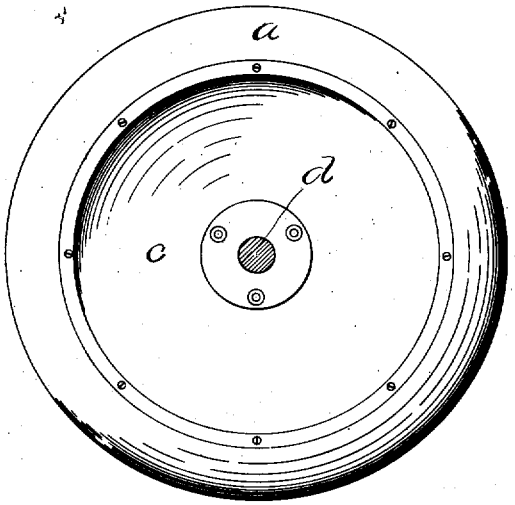
Figure 2:
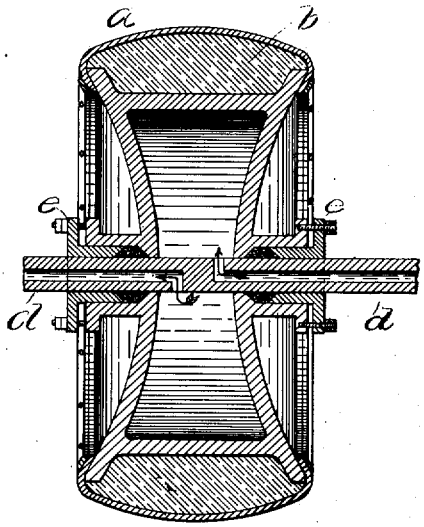
Figure 3:
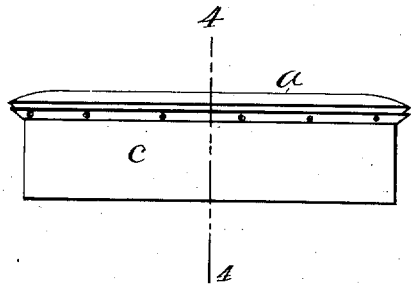
Figure 4:
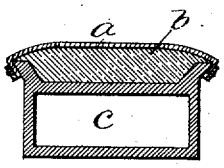

Of the accompanying drawings, forming a part of this specification, Figure 1 represents a side elevation of a rotary wheel which may be used in carrying my improved method into practice. Fig. 2 represents a section on line 2 2, Fig. 1. Fig. 3 represents a side view of a reciprocating device which may be used as a substitute for the wheel shown in Figs. 1 and 2. Fig. 4 represents a section on line 4 4, Fig. 3.

The same letters of reference indicate the same parts in all of the figures.

In carrying out my invention I employ a facing or sheet *a*, of cloth or other yielding and flexible material, supported on an elastic bed *b*, which is interposed between the cloth facing and a hollow chamber *c*, adapted to receive and be heated by steam, the arrangement being such that the heat of the steam is imparted through the elastic bed to the facing *a*. Said facing may be of any suitable cloth, cotton being preferred, or any other suitable material, such as chamois-skin; and the bed *b* may be of felt or any other suitable material which will constitute a yielding or elastic support for the facing *a* and will permit said facing to conform to the curved surfaces of heel, shank, and sole edges and shank and sole bottoms, as well as to flat surfaces, such as the treads of heel top lifts, the object of the bed *b* being to permit the facing *a* to bear at once and with a uniform pressure on all the area of the surface to be operated on that said facing is capable of covering. The steam-chamber *c* and the bed and facing thereon are capable of being rapidly moved, so that the facing can exert a suitable friction upon the surface to be operated on, said surface being presented to the facing by the operator, as hereinafter explained.

The steam-chamber is conveniently operated when made in the form of a wheel, as shown in Figs. 1 and 2, the bed *b* being applied to the periphery of the wheel, as shown in Fig. 2, and the facing *a* secured to the wheel in such manner as to cover the bed. As here shown, the wheel-shaped chamber is provided with stuffing-boxes *e e*, which are fitted to rotate on a tubular journal *d*, the latter having a suitable connection at one end with a steam-generator and being open at the other end for the discharge of exhaust-steam, the arrangement being such that steam from the generator enters and circulates through the chamber *c* and then passes out through the exhaust end of the journal *d*. I do not limit myself to this construction, however, and may use any other suitably-constructed rotary chamber or hollow wheel adapted to support the bed *b* and facing *a* and to be internally heated by steam.

In polishing or finishing a boot or shoe sole or heel edge or other like part by the use of the heated yielding facing *a*, I first color with a black dye the surface to be operated upon, using, by preference, an aniline dye containing a solution of gum-arabic or other gum, which gives the die sufficient body to fill the pores of the leather at the surface thereof. The facing *a* being now heated by the admission of steam to the chamber *c*, the operator applies to the heated surface of said facing a suitably-hard wax adapted to be melted by the heat of the facing *a*. When the wax is in a suitably-soft condition, the said facing is rapidly moved by rotating the chamber *a* by power applied in any suitable way, and the surface to be polished and finished is pressed against the facing and held there and suitably rocked or moved until all parts of the said surface have been subjected to the action of the facing and received therefrom a coating of wax.

It will be seen that by melting the wax and supporting it while melted on a rapidly-moving heated yielding surface, which is adapted to conform to the curves and inequalities of the surface of the part of the boot or shoe to be treated, I am enabled to coat said surface much more uniformly, evenly, and rapidly than by the use of a wheel of soapstone or other rigid material, such as has before been used in waxing boot or shoe heels. The close contact of the yielding waxed facing with the surface to be finished makes the wax coating more brilliant and enables the operation to be performed with less outlay of muscular force than by the use of a rigid wheel.

The chamber *c* may be constructed to be reciprocated instead of being rotated, in which case the facing *a* and bed *b* will be on one side only of the chamber, as shown in Figs. 3 and 4.

The preliminary dyeing of the part to be finished insures the desired color after the finishing operation.

Thus it will be seen that the method pursued in this invention is first to blacken the surface by dyeing as opposed to blackening by means of "burnishing-ink," so called. In the dyeing process the subsequent treatment is by melted wax and a rapidly-moved heated soft polishing-surface, while in the case of the burnishing-ink the polishing is by means of a hard heated surface.

I have described my yielding surface used for polishing as to be heated by steam, and as constructed so as to receive steam for that purpose; but it is not necessary that it be so heated, for I have found in practice that sufficient heat for bringing the wax to the suitably-soft condition will be generated by the friction of the rapidly-moving yielding surface, so that the wax may be applied to the boot or shoe in some suitable way before the friction-rubber is set to work.

In my process the polishing or finishing is accomplished much more economically, quickly, and with less labor than heretofore, and it is much more nearly perfect, even, and durable than by the old processes.

I claim—

1. The improvement in the art of polishing and finishing sole and heel edges and other parts of boots or shoes, which consists in dyeing the said parts or surfaces black and treating the said surfaces with wax or other resinous or water-proof compound and polishing the same by contact with a rapidly-moving yielding surface, substantially as described.

2. The combination of a movable chamber *c*, adapted to receive steam, a yielding bed *b* in contact with said chamber, and a flexible facing *a*, supported by said bed, as set forth.

In testimony whereof I have signed my name to this specification, in the presence of two subscribing witnesses, this 7th day of January, A. D. 1891.

WILLIAM W. CROOKER.

Witnesses:
JOHN F. SWAIN,
ARTHUR W. CROSSLEY.